Figure 1:
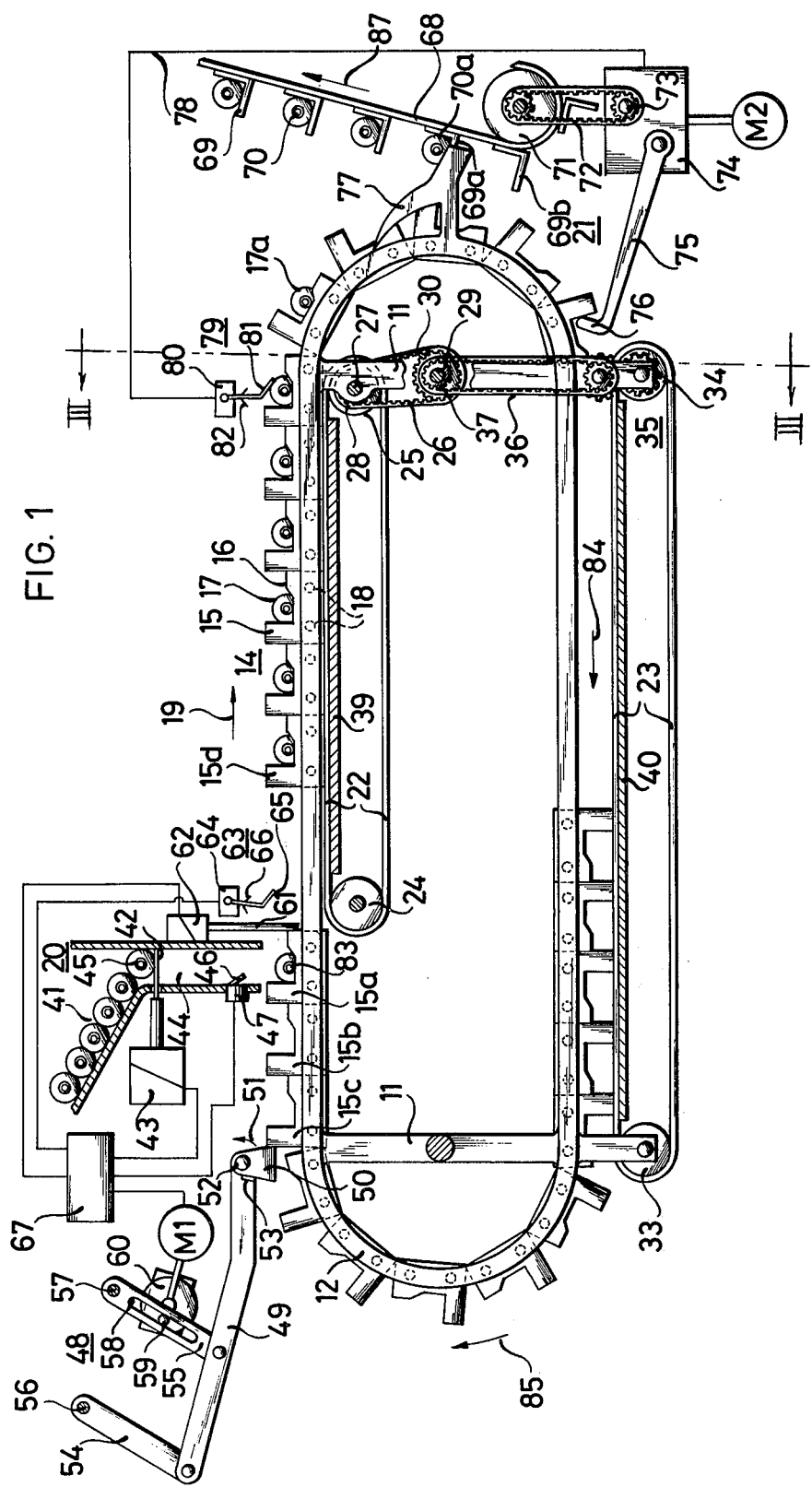

United States Patent [19]

Kupper

[11] 4,162,723
[45] Jul. 31, 1979

[54] BUFFER STORAGE DEVICE FOR TRANSFERING TEXTILE COILS

[75] Inventor: Willi Küpper, Rickelrath, Fed. Rep. of Germany

[73] Assignee: W. Schlafhorst & Co., Monchengladbach, Fed. Rep. of Germany

[21] Appl. No.: 886,410

[22] Filed: Mar. 14, 1978

Related U.S. Application Data

[63] Continuation of Ser. No. 718,519, Aug. 30, 1976, abandoned.

[30] Foreign Application Priority Data

Aug. 28, 1975 [DE] Fed. Rep. of Germany ....... 2538273

[51] Int. Cl.² ...................... B65G 35/06; B65G 43/08
[52] U.S. Cl. ................................... 198/469; 198/472; 198/795
[58] Field of Search ............... 198/464, 466, 469, 470, 198/472, 483, 648, 795; 221/13; 141/167, 168, 170, 176, 183; 53/249, 250; 425/261

[56] References Cited

U.S. PATENT DOCUMENTS

| 3,902,587 | 9/1975 | Checcucci | 198/472 |
| 3,980,175 | 9/1976 | D'Agnolo et al. | 198/469 |

Primary Examiner—Robert B. Reeves
Assistant Examiner—Jeffrey V. Nase
Attorney, Agent, or Firm—Herbert L. Lerner

[57] ABSTRACT

Buffer storage device for transfering textile coils from an irregularly operating coil feeding device to a uniformly advancing coil delivery device having a given coil delivery velocity includes a multiplicity of identical transport elements for at least one textile coil, respectively, the transport elements being shiftable towards one another, a conveyor section extending from the coil feeding device to the coil delivery device, the transport elements being movable on the conveyor section from the coil feeding device to the coil delivery device with varying and at least two-stage travel velocity so that the travel velocity thereof at least immediately before reaching the coil delivery device, in travel direction of the transport elements, corresponds to the given coil delivery velocity and otherwise is greater than the coil delivery velocity.

7 Claims, 3 Drawing Figures

BUFFER STORAGE DEVICE FOR TRANSFERING TEXTILE COILS

This is a continuation of application Ser. No. 718,519 filed Aug. 30, 1976 and now abandoned.

The invention relates to a buffer storage device for transfering textile coils from an irregularly operating coil feeding device to a uniformly conveying coil delivery device. Such buffer storage devices are used, for example, in apparatus which make spinning cops ready for rewinding.

In such buffer storage devices, the textile coils are held available or stocked closely adjacent one another. Consequently, operating troubles or breakdowns can occur, for example, if damaged coils or non-uniformly or irregularly, one-sidedly wound or insufficiently wound coils lie next to coils of normal condition or character.

This makes it difficult to deposit and pass on the coils in an orderly manner. Furthermore, coils of abnormal condition or character have the tendency to lie transversely in the buffer storage device and to block further transport thereby.

It is accordingly an object of the invention to provide a buffer storage device for transfering textile coils which avoids the foregoing disadvantages of the heretofore known devices of this general type.

With the foregoing and other objects in view, there is provided, in accordance with the invention, a buffer storage device for transfering textile coils from an irregularly operating coil feeding device to a uniformly advancing coil delivery device having a given coil delivery velocity comprising a multiplicity of identical transport elements for at least one textile coil, respectively, the transport elements being shiftable towards one another, a conveyor section extending from the coil feeding device to the coil delivery device, the transport elements being movable on the conveyer section from the coil feeding device to the coil delivery device with varying and at least two-stage travel velocity so that the travel velocity thereof at least immediately before reaching the coil delivery device, in travel direction of the transport elements, corresponds to the given coil delivery velocity and otherwise is greater than the coil delivery velocity.

In accordance with another feature of the invention, the buffer storage device includes means for indicating the transport-element content of the storage device, and means for switching off the coil feeding device when a predetermined maximal transport-element content is reached and for switching off the coil delivery device when a predetermined minimal transport-element content is reached. It is not so important to determine in each case the instantaneous storage content, but it is important to signal or indicate when a predetermined maximum or minimum transport-element storage content is reached. Furthermore, such a construction prevents the buffer storage device from being overfilled and the coil delivery device from running empty.

In accordance with a further feature of the invention, the buffer storage device includes at least one endless conveyer belt associated with the conveyer section for transporting the transport elements, the endless conveyer belt having a travel velocity greater than the given coil delivery velocity.

In accordance with a feature supplementing the last-mentioned feature of the invention, the buffer storage device further comprises advancing means for stepwisely transporting an empty transport element to the coil feeding device and for simultaneously transporting farther into operating range of the conveyer belt a filled transport element located adjacent the empty transport element.

In accordance with an added feature of the invention, the buffer storage device includes a common stepping mechanism associated with the coil delivery device and the conveyor section for stepwise advancing the transport elements with a rhythm corresponding to that with which the coils are delivered by the coil delivery device.

To facilitate delivery of the coils from the buffer storage device, there are provided, in accordance with an additional feature of the invention, means defining guidance contours for transfering individual textile coils to the coil delivery device, the guidance contour means being associated with the conveyer section.

In accordance with a concomitant feature of the invention, the transport elements are slidably mounted on the conveyer belt during stepwise transport thereof by the advancing means, at least before reaching the coil delivery device.

The advantages achieved with the invention are in particular that an orderly, continuous and trouble-free transfer of individually stored textile coils of any size and quality from an irregularly operating coil feeding device to a uniformly conveying coil delivery device is possible and that thereby, idling of the entire installation, e.g., an installation for preparing spinning cops for rewinding, is largely prevented.

Other features which are considered as characteristic for the invention are set forth in the appended claims.

Although the invention is illustrated and described herein as embodied in a buffer storage device for transfering textile coils, it is nevertheless not intended to be limited to the details shown, since various modifications and structural changes may be made therein without departing from the spirit of the invention and within the scope and range of equivalents of the claims.

Figure 2:
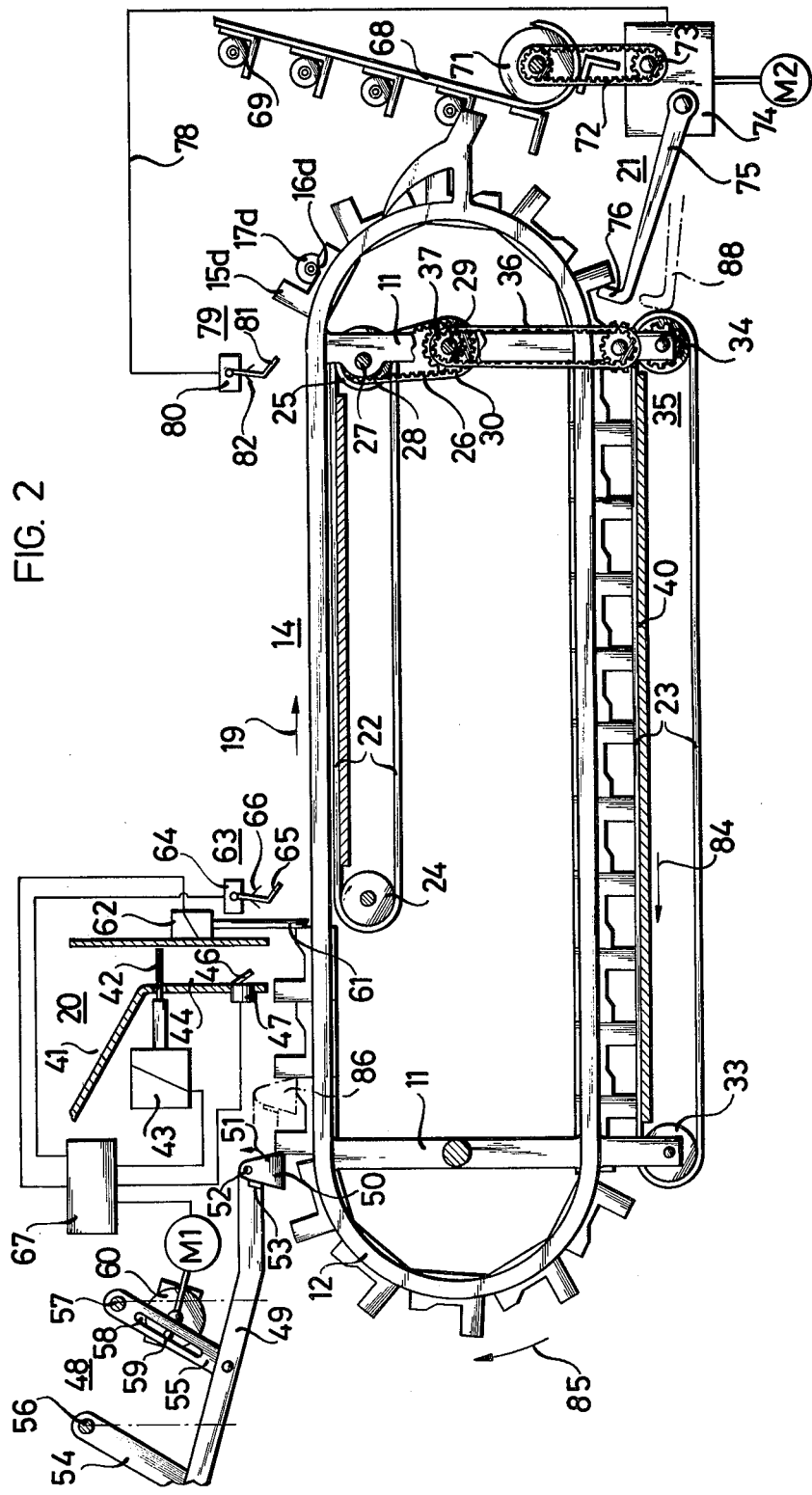
Figure 3:
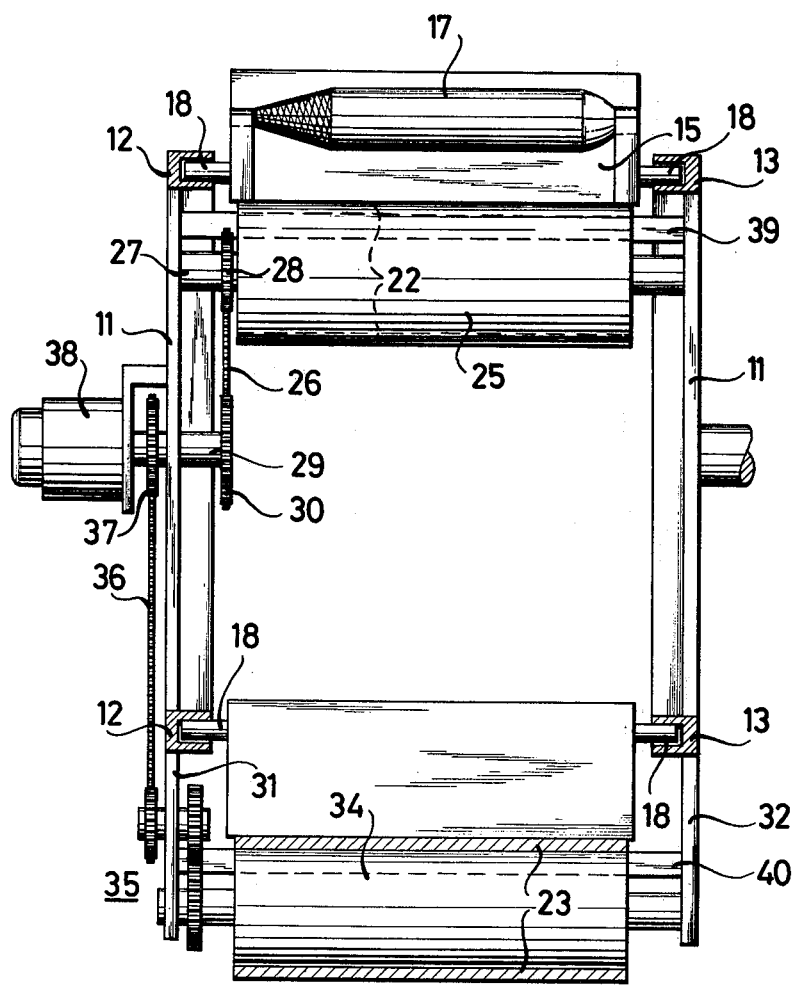

The construction and method of operation of the invention, however, together with additional objects and advantages thereof will be best understood from the following description of specific embodiments when read in connection with the accompanying drawings, in which:

FIGS. 1 and 2 are diagrammatic side elevational view of a buffer storage device for transfering coils according to the invention, shown in two different phases of the operation thereof; and FIG. 3 is an enlarged sectional view of FIG. 1 taken along the line III—III in the direction of the arrows.

Referring now to the drawing, there is shown in FIGS. 1 to 3 thereof, a stationary machine frame 11 supporting two endless guide rails 12 and 13 of a conveyer section 14, the guide rails 12 and 13 having U-shaped cross sections with the open sides thereof opposing one another. The guide rails 12 and 13 serve to guide twenty-four identical transport elements 15. The transport elements 15 are provided with receiving troughs 16 for receiving therein identical textile coils 17 to be transported and have on each side thereof two identical guide pins 18. In the illustrated embodiment of the invention, the ends of the coil cores lie in the receiving troughs 16. Thereby, coils with different diameters also are given a defined position in the transport elements 15.

The transport elements 15 are disposed on the conveyer section 14 so as to be shiftable toward one another. The conveyer travel direction is in direction of the arrow 19. The transport elements 15 can travel in a circulating path from a coil feeding device 20 to a coil delivery device 21 and return from there, in a direction opposite the direction of the arrow 19, to the coil feeding device 20.

Two endless conveyer belts 22, 23 are disposed for transporting the transport elements 15. The conveyer belt 22 is conducted over two belt rollers 24 and 25 which are supported in stationary bearings. The belt roller 25 is rotatably driven by means of a serrated belt 26, meshing with a gear 28 connected to the shaft 27 of the roller 25 and a gear 30 connected to the motor shaft 29 of a drive motor 38.

The conveyer belt 23 extends over two belt rollers 33 and 34 which are supported in stationary bearings in cross pieces or traverses 31 and 32. The belt roller 34 is driven by means of a reduction gear 35 connected to the shaft of the roller 34, a serrated belt 36 meshing with the reduction gear 35 and with a gear 37 connected to the drive shaft 29 of the motor 38.

To provide good contact between the transport elements 15 and the conveyer belts and thereby ensure reliable further transportation or conveyance, a flat plate 39 is disposed below the conveyer belt 22, and a flat plate 40 is disposed below the conveyer belt 23. The plates 39 and 40 are raised so high that the transport elements 15 located above the plates 39 and 40, respectively, rest on the conveyer belts with the entire gross weight thereof.

The coil feeding device 20 has a collecting shaft 41 for textile coils 45. The collecting shaft 41 is closed by a slider 42 which can be actuated by an electromagnet drive 43. Below and closely following the slider 42 is a supply shaft 44, through which any of the textile coils 45 that may be in the collecting shaft 41 can drop individually into the receiving trough 16 of a transport element 15 which is in made-ready condition under the supply shaft 44. The slider 42 controls the isolation or separation of the textile coils 45 into individual coils. A coil 45 that falls freely through the supply shaft 44 respectively actuates a signalling flap 46 of a pilot or indicator switch 47.

The coil feeding device 20 also has an advancing device 48 for advancing individual transport elements 15 by one transport-element length. The advancing device 48 has a push rod 49, at the end of which a gripper 50 is articulatingly suspended. The gripper 50 can turn in the direction of the arrow 51 about the articulating joint 52 thereof. The movement of the gripper 50 in direction opposite that of the arrow 51 is limited by a stop 53, however.

The push rod 49 is articulatingly suspended in a parallel-guidance system formed of straps 54 and 55 which are pivotable about stationary shafts 56 and 57. The strap 55 has a coulisse or slot 58, in which there engages a sliding block or pin 59 that is firmly connected to a disc 60. The disc 60 is drivable by a motor M1.

Part of the coil feeding device 20 is also a latch 61 which can be actuated by an electromagnetic actuator 62, and a device 63 for signalling or indicating the maximal content of the storage device. The device 63 is formed of an indicating or signalling switch 64 with a sensing tab or feeler 65, which has a delay device 66.

The motor M1, the electromagnetic drives 43 and 62, the signalling or indicating switch 47 and the signalling or indicating switch 64 or the device 63, respectively, are connected by electric lines to an electric switching unit 67 that may be of any conventional construction known to anyone of ordinary skill in the art.

The coil delivery device 21 has a chain conveyer 68 with pockets 69 for receiving the textile coils 70. A reversing or deflecting roller 71 or the chain conveyer 68 is driven by means of a serrated belt 72 meshing with a gear 73 of a transmission and switch box 74. The drive is effected synchronously with the delivery of the textile coils from the conveyer section 14. For this purpose, a common and conventional stepping mechanism 75, which is part of the transmission and switch box 74 and which, with a projection 76 thereof, in a predetermined rhythm, releases one transport element 15 at a time to travel farther, is associated with the coil delivery device 21 and the conveyer section 14. A motor M2 serves to drive the gearing or transmission disposed in the gear or transmission box.

In FIGS. 1 and 2, there can be seen to the right-hand side of the guide rail 12, a guidance contour member 77 for transfering individual textile coils to the coil delivery device 21. A further, similar guidance contour fastened to the guide rail 13, is blocked from view in the drawing by the guidance contour members 77 and is therefore not visible. Both guidance contour members 77 do not come into contact with the textile coils at the windings thereof but only at the ends of the coil cores which protrude from the coil windings. From the transmission and switch box 74, an electrical line 73 leads to a device 79 for signalling or indicating the minimal content of the storage device. The device 79 is formed of a signalling or indicating switch 30 with a sensing tab or feeler 81, which has a delay device 82.

The loading and unloading process of the buffer storage device according to the invention is described in detail hereinafter, especially with reference to the illustration thereof in FIG. 1. A textile coil 83 happens to be in the transport element 15a. The textile coil 83 had previously been released by the slider 42 and had dropped from the supply of textile coils 45 in the collecting shaft 41 through the supply shaft 44 into the receiving trough 16 of the transport element 15a. While dropping through the shaft 41, the textile coil 83 had depressed the signalling tab or feeler 46 and thereby actuated the signalling or indicating switch 47.

Thereby, the electric switching unit 67 has, in fact, switched-on the motor M1 for one revolution of the disc 60 and has instituted the raising of the latch 61 by the electromagnet 62. As is readily apparent, the foregoing actions may be effected by relatively simple means in the electric switching unit 67 that are of common design.

After the latch 61 is raised, the path is free for the transport element 15a to continue its travel in direction of the arrow 19.

Since the motor 38 is switched on, both conveyer belts 22 and 23 are running; the conveyer belt 22 in direction of the arrow 19, and the conveyer belt 23 in direction of the arrow 84. The velocity of the conveyer belts 22 and 23 is greater than the coil delivery velocity. The upper parts of the transport elements 15 conducted in the lower straight portion of the guide rails 12 and 13 rest on the conveyer belt 23 because the transport elements 15 hang as they travel. The force transmitted by friction to the transport elements and acting in direction of the arrow 85, may not be sufficient under certain circumstances to advance the laden transport element 15a and the transport elements shifted together behind it, quickly and freely. The advancing device 48 therefore is actuated. The gripper 50 of the advancing device 48 has been set behind the transport element 15c and travels, during one revolution of the disc 60, quickly into the position 86 thereof shown in phantom in FIG. 2. Accordingly, the transport elements 15a, 15b and 15c are shifted forward by one length of a transport element. As soon as the transport element 15a has been shifted forward about half the length of a transport element, it is caught by the conveyer belt 22 and shifted to the transport element 15d. During the return of the gripper 50 to the position thereof shown in FIG. 1, it avoids contact with the transport elements because of the articulated suspension thereof.

When the gripper 50 of the advancing device 48 has reached the position 86 thereof shown in phantom in FIG. 2, the switching unit 67 switches the electromagnetic drive 62 off again, so that the latch 61 drops back into the starting position thereof shown in FIG. 1; the transport element located under the supply shaft 44 i.e. then already the transport element 15b, as shown in FIG. 1, is thereby prevented from traveling farther in direction of the arrow 19.

Simultaneously, drive 43 is switched on by the switching unit 67 for a brief period, whereby the slider 42 releases the textile coil 45, and the hereinaforedescribed feeding and transporting process is repeated.

Each time a transport element passes under the signalling or indicating switch 64, the sensing tab or feeler 65 responds briefly. However, because of the delay device 66, no signal pulse is transmitted to the signalling or indicating switch 64. This time-dependent suppression of the signalling or indicating pulse may alternatively also be provided circuit-wise in the signalling or indicating switch 64 or in the switching unit 67. If, however, the buffer storage device according to the invention has attained the maximum content thereof and the transport element, which was pushed forward lost by the advancing device 48, stops under the sensing tab or feeler 65, the device 63, with an adjusted time delay, transmits a signal pulse to the switching unit 67 which, thereupon, stops the advancing device 48. Only when the sensing tab or feeler 65 drops back into the position thereof shown in FIG. 1 is the advancing device 48 set in operation again.

The chain conveyer 68 of the coil delivery device 21 transports the textile coils 70 disposed in the pockets 69 in direction of the arrow 87 at a given constant velocity. As soon as a textile coil 70a has rolled off over the guidance contour members 77 into the pocket 69a, the transmission of the transmission and switch box 74 swings the projection 76 of the stepping mechanism 75, in synchronism with the chain conveyer 68, to the position 88 thereof, shown in phantom in FIG. 2, and back again to the stirring position thereof shown in solid lines. In the interim, the filled transport elements of the conveyer section 14 have time to travel on by the spacing of one transport element whereby, according to FIG. 1, the textile coil 17a, for example, is shifted into a position enabling it to roll off over the guidance contour members 77 into the pocket 69b, which at that instant has already travelled on by the spacing or division of one pocket.

The emptied transport elements are continuously shifted toward one another by the conveyer belt 23 in direction toward the coil feeding device 20 and in direction of the arrows 84 and 85.

As the transport elements travel on under the signalling or indicating switch 80, the sensing vane or feeler 81, which is shown in FIG. 1 in off position, responds briefly. Because of the delay device 82, however, no signal pulse is passed on to the signalling or indicating switch 80. The signalling or indicating pulse is time-dependently suppressed as in the case of the signalling or indicating switch 64. When, however, the buffer storage device has attained the minimal content thereof, as shown in FIG. 2, the sensing tab or feeler 81 stops finally in the "on" position, and the device 79 passes along a signal pulse with a set or adjusted time delay to the transmission and switch box 74 in order to stop the chain conveyer 68. The chain conveyer 68 is set in operation again only when a filled transport element is shifted to the location of the transport element 15d and, thereby, the sensing tub or feeler 81 returns to the "off" position.

FIG. 2 of the drawing shows that the collecting shaft 41 no longer contains textile coils, and the minimal content of the storage device, namely a single textile coil 17d, has been reached. The chain conveyer 68 has already been stopped, so that none of its pockets remains empty.

As mentioned hereinbefore, the invention of the instant application is not limited to the hereinaforedescribed embodiment, which is shown only diagrammatically in the drawings. Advancement of the transport elements stepwise can also be accomplished, for example, by having the gripper 50 of the advancing device 48 press against the textile coil lying on the transport element. In that case, controlling the advancing device 48 becomes unnecessary. The advancing device 48 could then execute advancing stepwise movements in continuous exchange. Even so, a transport element could be advanced stepwise only if a textile coil lies on the transport element.

What are claimed:

1. Buffer storage device for transferring textile coils from an irregularly operating coil feeding device to a uniformly advancing coil delivery device having a given coil delivery velocity comprising a multiplicity of identical transport elements for at least one textile coil, respectively, said transport elements being shiftable towards one another, a conveyer section extending from the coil feeding device to the coil delivery device, said transport elements being movable on said conveyer section from the coil feeding device to the coil delivery device, and means for varying the velocity of travel of said transport elements along said conveyer section in at least two velocity states so that the travel velocity thereof before reaching the coil delivery device, in travel direction of the transport elements, corresponds to the given coil delivery velocity and otherwise is greater than the coil delivery velocity.

2. Buffer storage device according to claim 1 including means for indicating the transport-element content of the storage device, and means for switching off the coil feeding device when a predetermined maximal transport-element content is reached and for switching off the coil delivery device when a predetermined minimal transport element content is reached.

3. Buffer storage device according to claim 1 including at least one endless conveyer belt is associated with said conveyer section for transporting said transport elements, said endless conveyer belt having a travel velocity greater than the given coil delivery velocity.

4. Buffer storage device acording to claim 3 comprising advancing means for stepwisely transporting an empty transport element to the coil feeding device and for simultaneously transporting farther into operating range of said conveyer belt a filled transport element located adjacent the empty transport element.

5. Buffer storage device according to claim 4 wherein said transport elements are slidably mounted on said conveyer belt during stepwise transport thereof by said advancing means, at least before reaching the coil delivery device.

6. Buffer storage device according to claim 1 including a common stepping mechanism associated with the coil delivery device and said conveyer section for stepwise advancing said transport elements with a rhythm corresponding to that with which the coils are delivered by the coil delivery device.

7. Buffer storage device according to claim 1 including means defining guidance contours for transforming individual textile coils to the coil delivery device, said guidance contour means being associated with said conveyer section.